United States Patent [19]

von Holdt

[11] 4,172,577

[45] Oct. 30, 1979

[54] PIVOT MOLD ASSEMBLY DEFINING INTERNAL PIVOT MEMBER

[76] Inventor: John W. von Holdt, 7430 N. Croname Rd., Niles, Ill. 60648

[21] Appl. No.: 935,342

[22] Filed: Aug. 21, 1978

Related U.S. Application Data

[63] Continuation-in-part of Ser. No. 781,631, Mar. 28, 1977, Pat. No. 4,114,849.

[51] Int. Cl.² .............................................. B29C 1/14
[52] U.S. Cl. ....................................... 249/58; 249/145; 425/577; 425/DIG. 58; 425/DIG. 121
[58] Field of Search ......................... 249/58, 59, 63, 64, 249/145; 425/577, DIG. 58, DIG. 121

[56] References Cited

U.S. PATENT DOCUMENTS

| | | | |
|---|---|---|---|
| 3,152,365 | 10/1964 | Fisher | 249/59 |
| 3,373,479 | 3/1968 | Watt et al. | 249/59 |
| 3,618,170 | 11/1971 | Owens | 249/59 |
| 3,832,437 | 8/1974 | Taylor | 249/63 |
| 4,114,849 | 9/1978 | von Holdt | 249/58 |
| 4,125,246 | 11/1978 | von Holdt | 249/58 |

Primary Examiner—Theodore Morris
Assistant Examiner—Arthur H. Koeckert
Attorney, Agent, or Firm—Charles F. Pigott, Jr.

[57] ABSTRACT

A stop boss formed on the handle of a pail may be simultaneously molded along with the pail and its handle by means of a pair of pivotable members which have free ends abutting together in a first pivoting position, and which are spaced from each other in a second pivoting position. The free ends cooperatively define between them a mold cavity for forming the stop boss on the rotatable handle. The pivotable members are adapted to occupy their first pivoting position while the mold assemblies close, and to pivot into the second, open pivoting position upon opening of the mold assembly and removal of the molded part to facilitate removal of the stop boss.

5 Claims, 9 Drawing Figures

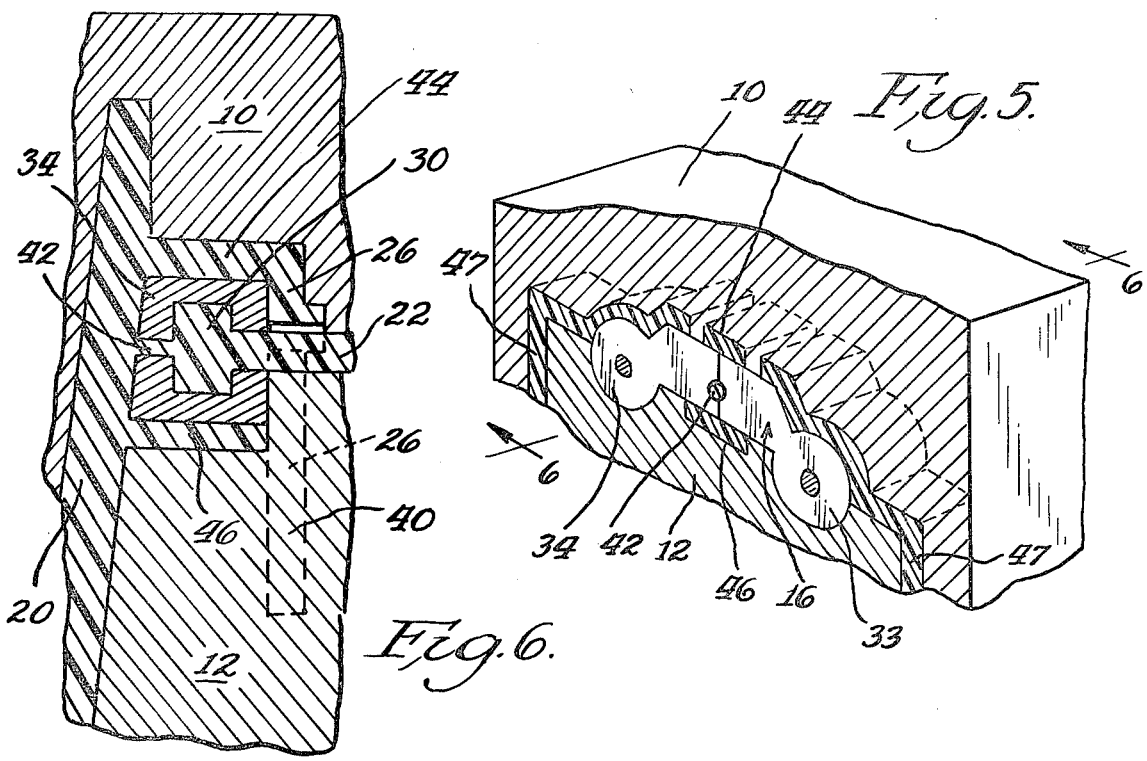
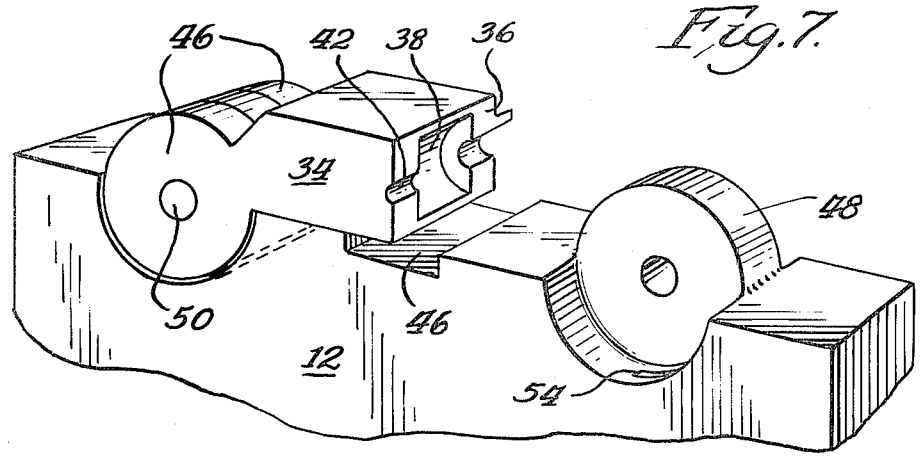
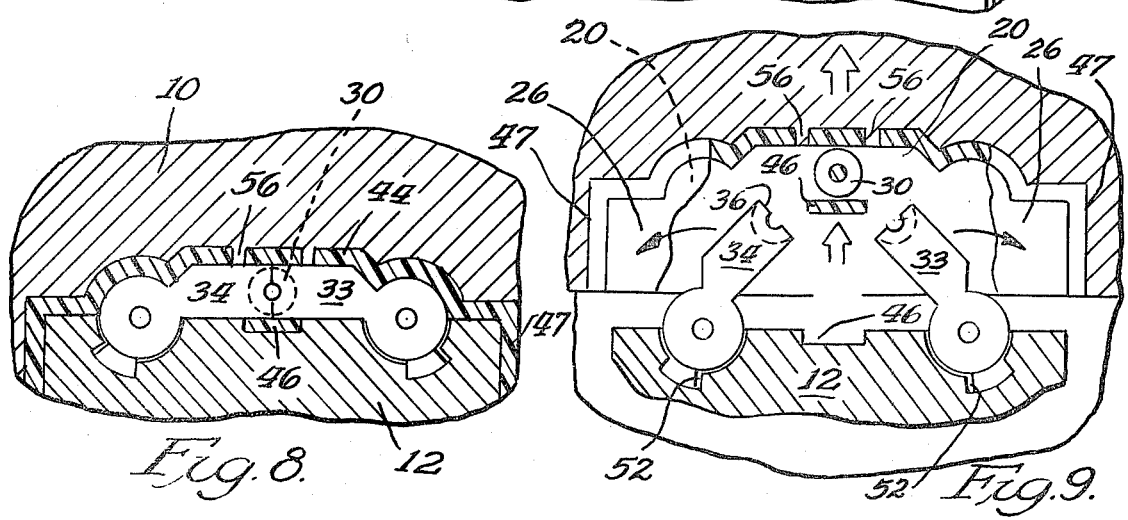

PIVOT MOLD ASSEMBLY DEFINING INTERNAL PIVOT MEMBER

CROSS-REFERENCE TO RELATED APPLICATION

This application is a continuation-in-part of U.S. Patent Application Ser. No. 781,631, filed Mar. 28, 1977, and entitled "Pivot Assembly, Method, and Article", now U.S. Pat. No. 4,114,849.

BACKGROUND OF THE INVENTION

In the patent application Ser. No. 781,631 cited above, apparatus is shown for molding a pivot or the like, and more particularly an internal pail pivot, by the use of a pair of opposed slide members which define the pivot or boss mold chamber and are selectively slidingly engagable and disengagable one with the other to form the chamber in a first position and to release the formed pivot or boss in a second position.

In accordance with this invention, the sliding members of the previously cited patent application may be replaced by a pair of pivotable members which perform the generally equivalent function of defining a mold cavity for forming the retaining portion on an internal member such as a stop boss for a bucket, which may be simultaneously molded along with and between a pair of molded walls, formed as a retaining member for the boss.

The above represents a significant simplification of complex molding processes for the "single shot" molding of intricate structures which can be movable with respect to each other as, for example, a simultaneously molded bucket handle having retaining bosses on the ends, and the retaining members surrounding the boss, which may be positioned as taught in the previously cited application so that the bucket handle is freely movable despite the fact that the bucket handle, retaining bosses and the retainers for each boss are all prepared in the same molding step.

DESCRIPTION OF THE INVENTION

In accordance with this invention, a mold assembly is provided for forming an inner structure positioned between a pair of spaced, molded walls in a single operation. The mold assembly comprises a pair of cooperating openable and closable mold members adapted to form mold spaces for forming the molded walls.

In accordance with this invention a pair of pivotable members are positioned between the spaces for forming the molded walls, said pivotable members defining free ends which abut together in a first pivoting position and which are spaced from each other in a second pivoting position. The free ends cooperatively define between them a mold cavity for forming the inner structure positioned between the molded walls, whereby the pivotable members are adapted to occupy their first pivoting position while the mold assembly is closed, to receive and shape molding compound into the molded inner structure. Thereafter, the pivotable members can pivot into their second pivoting position upon opening of the molded assembly and removal of the molded parts, to facilitate removal of said molded structure.

Specifically, it is contemplated in one embodiment that the mold assembly of this invention may be used for forming a retaining boss or portion on a freely rotatable pail handle, which extends through a passage formed in one wall of the retaining portion to a position intermediate the one wall and the annular wall of the pail. In this instance, the spaces for forming the pair of walls define the one wall of the retaining portion and the pail wall itself, with the pivotable members being positioned between those spaces and adapted to form the retaining portion on the bucket handle.

In the drawings,

FIG. 5 is a fragmentary perspective view, with portions broken away, showing the parts of FIG. 4 in their closed, molding position.

FIG. 6 is a sectional view taken along line 6—6 of FIG. 5.

FIG. 7 is a fragmentary perspective view of one pivotable member and related parts, with the other pivotable member removed.

FIG. 8 is a fragmentary view, taken in vertical section, showing the pivotable members at the moment of molding in the closed mold position.

FIG. 9 is a fragmentary elevational view with parts broken away, showing the structure of FIG. 8 as the mold is opened.

Figure 1:
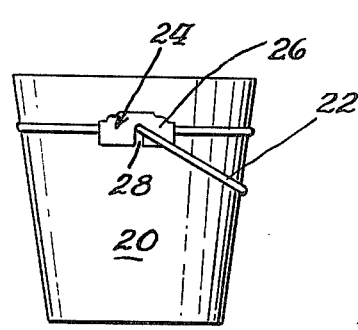
FIG. 1 is an elevational view of a bucket which may be molded in accordance with this invention.
Figure 3:
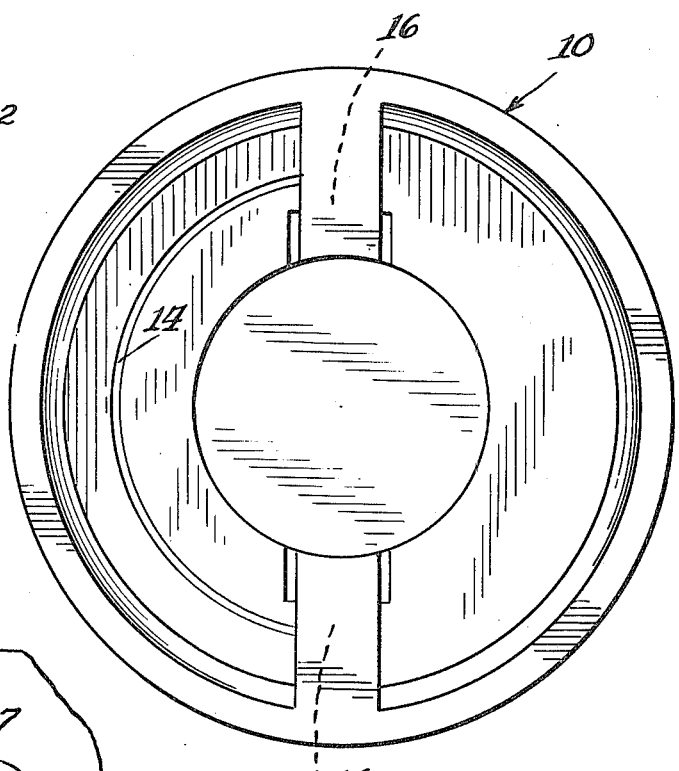
FIG. 3 is a bottom plan view of one ring portion of the mold of this invention.
Figure 2:
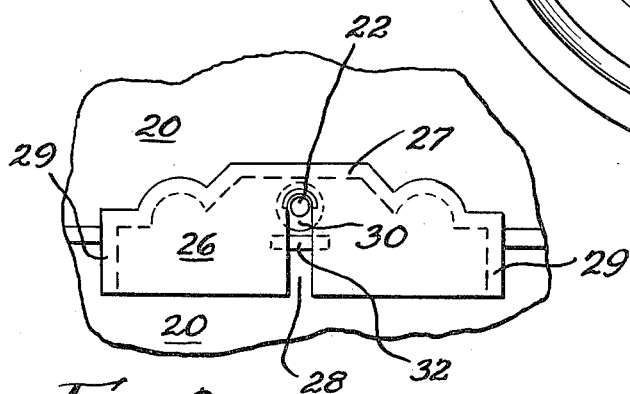
FIG. 2 is an enlarged fragmentary elevational view showing one of the handle retaining portions which may be integrally molded with the bucket in accordance with this invention.

Referring to the drawings, the apparatus of this invention is similar to the molding apparatus of copending U.S. application Ser. No. 781,631, filed Mar. 28, 1977 in its structure and concept of operation, except as otherwise described herein.

The mold of this invention comprises an upper mold ring 10 and a lower mold ring 12 (shown in fragment) which interact to form a mold for a bucket and handle in a conventional manner by approximately defining spaces between them. Channel 14 serves to mold the handle, and terminates in pivot mold insert assemblies 16 which are located diametrically to each other, each pivot mold insert assembly 16 being secured to ring 12.

The resulting bucket 20 as shown includes a molded structure having a movable handle 22 and a pair of retaining members 24, which each comprise an outer wall 26 which is spaced from the bucket wall, with handle 22 passing through aperture 28 in outer wall 26, as in the previously cited application. A boss 30 is integrally positioned on bucket handle 22 to prevent the withdrawal of handle 22 through aperture 28. An integrally molded bar member 32 is positioned between the outer wall 26 and the wall of bucket 20 itself to prevent removal of the handle downwardly through slot 28.

To accomplish this, the diametrically opposed mold insert assemblies 16 exhibit a structure as described below, while the remainder of the mold functions in accordance with conventional mold technology, and specifically as described in the previously cited patent application.

Referring specifically to FIGS. 5 and 7, insert member 16 is shown to be positioned on the lower mold half 12 and to comprise a pair of pivotable members 33, 34 which are positioned between spaces defined between mold rings 10, 12.

Figure 4:
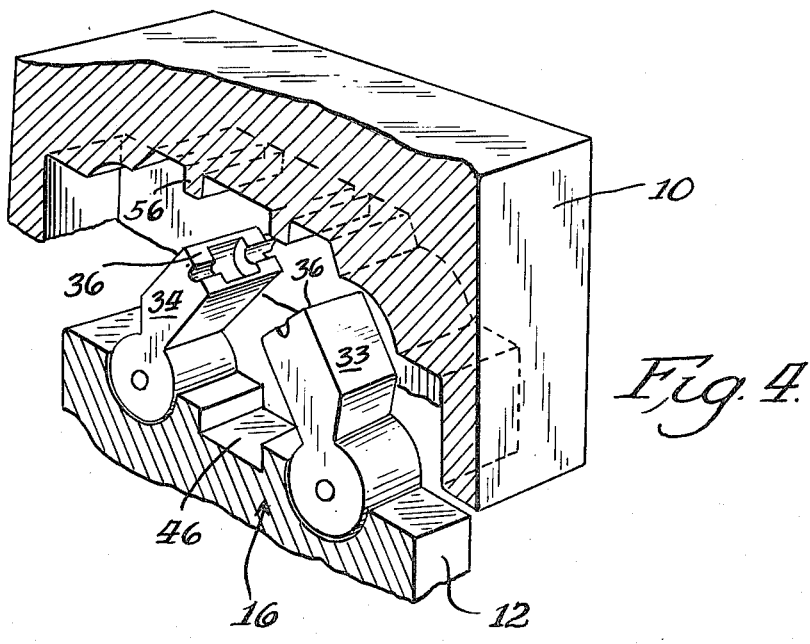
FIG. 4 is a fragmentary perspective view of the portions of the pair of ring portions which are adapted to mold the interior molded member within the pair of molded walls, and related parts, shown in an open mold position, with portions of the mold rings broken away.

As shown, pivotable members 33, 34 define free ends 36 (FIGS. 4 and 7) which abut together in a first pivoting position as shown in FIGS. 5 and 8, and which are spaced from each other in a second pivoting position as shown in FIGS. 4 and 9. Free ends 36 cooperatively define between them a mold cavity 38 for forming a molded structure between the molded walls, specifically the end of bucket handle 22 and the retaining boss 30 positioned on the bucket handle.

As shown in FIG. 6, mold rings 10, 12 cooperatively define between them spaces adapted for forming the bucket wall 20 itself and the spaced, slotted retaining wall 26, with a projecting portion 40 of mold ring 10 projecting through the space which forms wall 26, to define slot 28 in the finished product.

Bucket handle 22 is formed cooperatively by pivotable members 33, 34 and channel 14 in the upper mold 10, (with an optional mating channel in the corresponding lower mold 12).

Retaining boss 30 is defined in the mold chamber which is formed between the abutting pivotable members 33, 34. Small flow passageway 42 as part of mold chamber 38 provides access for molding material into the mold chamber 38 which in turn communicates with passageway 14 for molding the bucket handle 22 and boss 30. As in the previous application, access channel 42 is generally small so that handle 22 can be freely rotated to rupture the plastic cylinder which is formed during the molding process in that passageway.

Another mold space 44 is defined between mold ring 10 and the upper surfaces of pivotable members 33, 34 to form upper wall 27 of retaining member 26. Another mold space 46 between an upper surface of lower mold ring 12 and the lower surfaces of pivotable members 33, 34 define the retaining bar 32 in each completed diametrically opposed retaining assembly of the molded bucket. Side walls 29 of retaining member 26 are formed by mold spaces 47 between rings 10, 12.

As can be seen from FIG. 7, the pivotable members 33, 34 comprise a pair of lugs 46 which each fit around a retaining portion 48, carried by the lower mold ring 12. Pin 50 is positioned through an aperture in the retaining assembly 48 to hold the pivotable members 33, 34 in their pivoting position on mold ring 12.

As shown in FIGS. 5 and 8, when mold rings are brought together into the molding position, pivotable members 33, 34 are naturally positioned in abutting relation to define a mold chamber by mold recesses 38, which chamber is properly aligned in accordance with FIG. 6 with the remaining molding spaces. Molding material may pass through an appropriately positioned gate into the mold cavity, passing through the pair of diametrically opposed channels 42 to form the bucket handle 22, and passing through spaces 44, 46 to form outer vertical walls 29.

After the molding cycle is complete, upper and lower rings are separated as illustrated in FIGS. 4 and 9. As the molded bucket is moved upwardly, pivotable members 33, 34 may be rotated upwardly, causing the abutting faces 36 to separate, and permitting the removal of stop boss 30 from between them. Pivotable members 33, 34 slide from between walls 20, 26 as shown in FIG. 9, which permits removal of the bucket, despite the presence of bottom retaining wall 46 and side walls 47.

The rotational freedom of pivotable members 33, 34 is limited by projection 52, to prevent each rotatable member 33, 34 from assuming a vertical position with respect to mold ring 12. Projection 52 resides in stop slot 54 to appropriately limit the rotational capability of members 33, 34 to an unbalanced position, from which they will tend to fall back downwardly again into their original abutting position as shown, for example, in FIG. 5. This prevents damage to the mold since it reduces the chance that one of the members 33, 34 will remain in an upwardly pointing position as the mold rings close together.

Return pads 56 are also provided for spacing of the mold rings in the closed position.

Accordingly, buckets with rotatable handles may be fabricated in a single shot molding process with reliability and ease. The molding apparatus of this invention can also be used for the fabrication of many other types of molding structures in which an intermediate member is molded between a pair of walls.

The above has been offered for illustrative purposes only, and is not for the purpose of limiting the invention of this application, which is as defined in the claims below.

That which is claimed is:

1. A mold assembly for forming an inner structure positioned between a pair of spaced molded walls defined by a retention member for retaining said inner structure between said spaced, molded walls, which comprises: a pair of cooperating, openable and closable mold members adapted to define mold spaces for forming the molded walls, the improvement comprising:

a pair of pivotable members positioned between the spaces for forming the molded walls, said pivotable members defining free ends which abut together in a first pivoting position and which are spaced from each other in a second pivoting position, said free ends cooperatively defining between them a mold cavity for forming said inner structure, positioned between the molded walls, said mold cavity being defined by cavity portions defined in the abutting free ends of said pivotable members, and additional flow passageway means, of smaller transverse dimension than said mold cavity, positioned in the abutting, free ends of said pivotable members and communicating between said mold cavity and one side of said pivotable member, said flow passageway communicating, in the first pivoting position, with a mold space for forming said molded walls to provide access of mold material into said mold cavity whereby said pivotable members are adapted to occupy their first pivoting position while the mold assembly is closed to receive and shape molding compound into the molded inner structure, and said pivotable members are adapted to be pivoted into their second pivoting position upon opening of the molded assembly and removal of the molded part by action of the molded part, to facilitate removal of the molded structure.

2. The mold assembly of claim 1, adapted for forming a bucket and handle, in which said mold spaces for forming the pair of spaced, molded walls define respectively an annular mold space for forming said bucket wall and diametrically opposed mold spaces for forming outwardly positioned retaining walls, said molded structure formed by the pivotable members including the ends of said bucket handle and a retaining boss on said bucket handle, to prevent the passage of the handle ends through the outer retaining walls.

3. The mold assembly of claim 2 in which said pivotable members are carried by one of the cooperating openable and closable mold members.

4. The mold assembly of claim 3 in which each pivotable member carries a projection, and a stop slot carried by said one mold member, for receiving said projection to limit the rotational capability of said pivotable members to an unbalanced position, whereby said rotatable members tend to fall downwardly into their first abutting position.

5. The mold assembly of claim 1 in which an additional wall is defined as part of said retention member below the pair of spaced, molded walls, to retain said pivotable members within the retention member, whereby said additional wall, formed by the molding process and cooled, serves to pivot said pivotable members from the first to the second pivoting position upon opening of the molded assembly, facilitating removal of the pivotable members from between the pair of spaced, molded walls.

* * * * *